Figure 1:
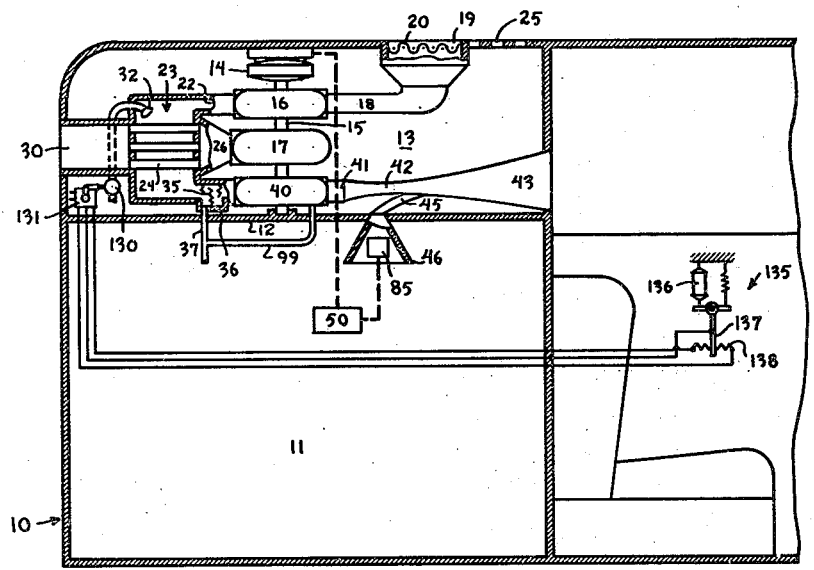

Dec. 8, 1942.   R. B. P. CRAWFORD   2,304,151
AIR CONDITIONING SYSTEM
Filed March 13, 1939   3 Sheets-Sheet 1

Inventor
Robert B. P. Crawford
By George H. Fisher
Attorney

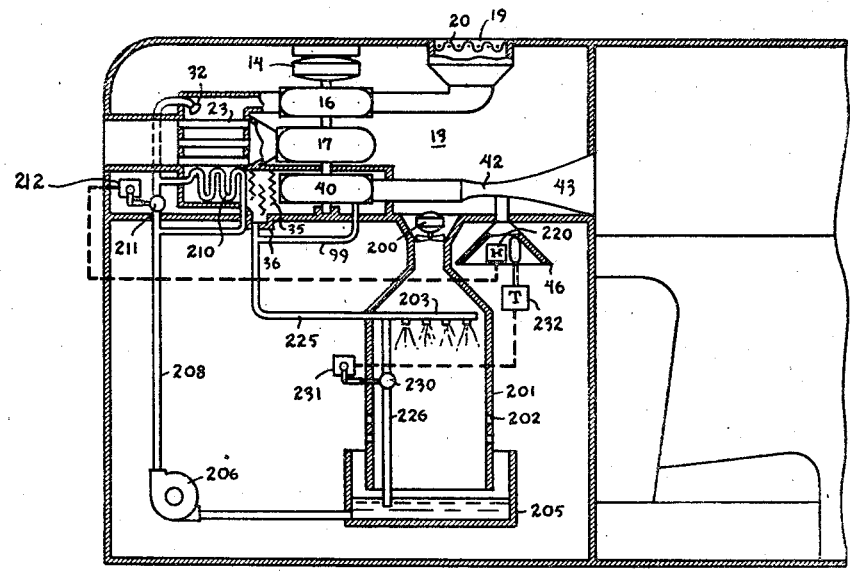
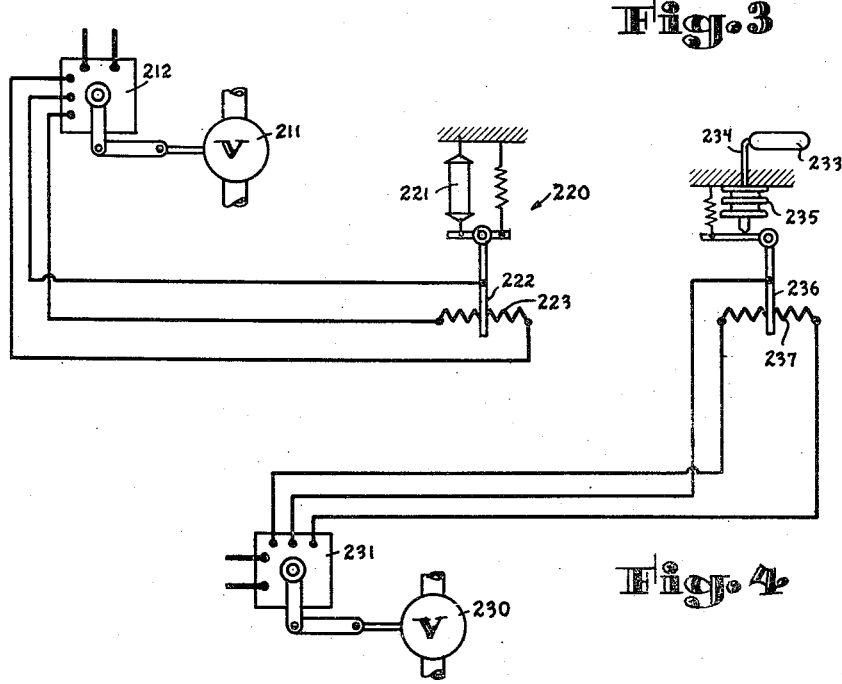

Dec. 8, 1942.  R. B. P. CRAWFORD  2,304,151
AIR CONDITIONING SYSTEM
Filed March 13, 1939   3 Sheets-Sheet 3

Inventor
Robert B. P. Crawford
By George H Fisher
Attorney

Patented Dec. 8, 1942

2,304,151

UNITED STATES PATENT OFFICE 2,304,151

AIR CONDITIONING SYSTEM

Robert B. P. Crawford, Miami, Fla.

Application March 13, 1939, Serial No. 261,487

14 Claims. (Cl. 62—6)

This invention relates to an air conditioning system and while the invention is illustrated and described particularly with reference to a railway car the principles thereof are applicable broadly to air conditioning systems for all types of structures.

In accordance with the teachings of my invention fresh unconditioned air is compressed to raise the temperature and pressure thereof, the air is then cooled while at the high pressure and washed, the cooling being effected in some forms of the invention by passing the air over an inter-cooler through which air at a temperature considerably lower than that of the compressed air flows whereby the temperature of the compressed air is considerably reduced, the air then having its excess moisture removed therefrom and then passing through a suitable expander which may be in the form of a turbine which returns power to the driving motor or may drive a suitable generator for charging batteries, etc. for furnishing power to the various parts of the air conditioning apparatus, the compressed air then being considerably reduced in temperature and having its pressure reduced to that of the atmosphere, the air then being mixed with return air from the space or with fresh outdoor air and being delivered to the space to be conditioned. The invention contemplates the provision of suitable control systems whereby the temperature and humidity of the space may be suitably controlled or whereby the humidity may be allowed to fluctuate within certain limits and the temperature controlled in a manner to maintain conditions of comfort within the space regardless of the humidity therein, with provisions for preventing the humidity from exceeding a certain high value. The temperature may be adjusted by adjusting the rate of compression of the air, by adjusting the amount of inter-cooling of the compressed air or by the provision of a separate cooler for removing sensible heat from the air within the space. The humidity may be controlled by controlling the amount of washing of the compressed air, by the temperature of the wash water or by the amount of compressed air which enters the system, it being understood that when the compressed air has been cooled and then expanded to secure a further reduction in temperature, the dew-point thereof is considerably lowered.

It is accordingly an object of my invention to provide an air conditioning system embodying the various principles outlined above and set forth in the accompanying specification.

Another object of my invention is to provide suitable control arrangements for controlling the air conditioning systems embodying the principles of my invention.

Figure 2:
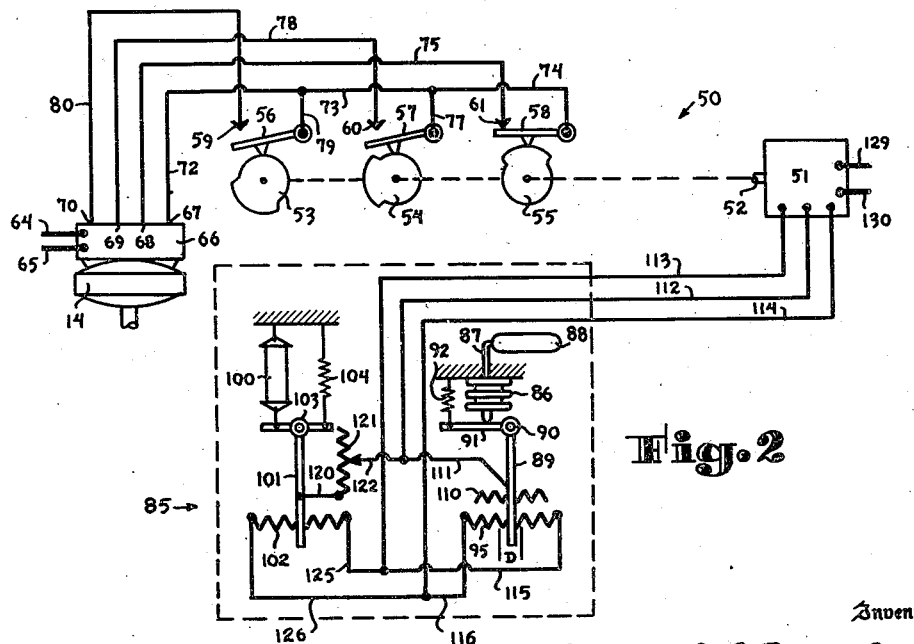
Figure 5:
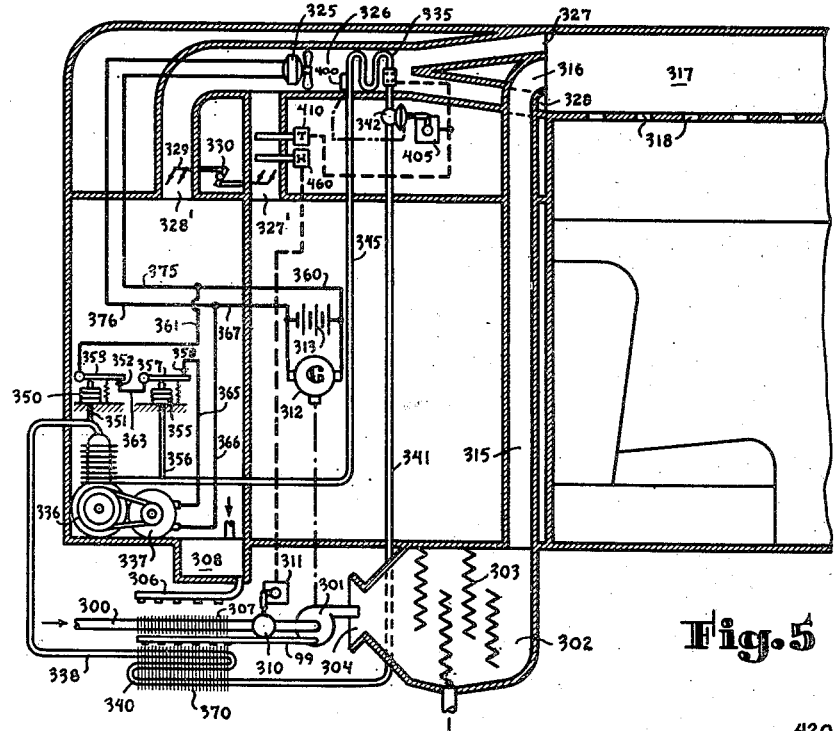
Figure 6:
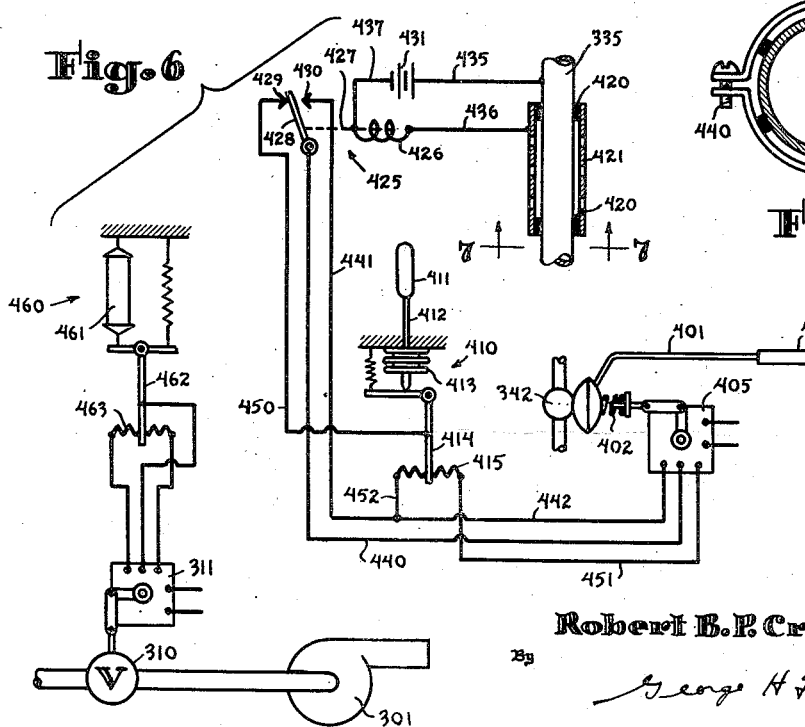
Figure 7:
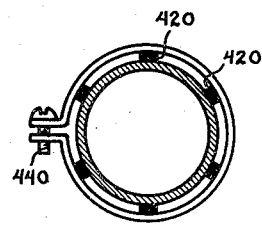

Other objects and advantages will become apparent upon a study of the specification, claims, and appended drawings wherein like reference characters represent like parts in the various views, and wherein Figure 1 is a view in cross section of the rear portion of a railway car illustrating one form of air conditioning system embodying my invention, Figure 2 is a wiring diagram of the control system for the air conditioning system of Figure 1, Figure 3 illustrates a modification of the air conditioning system of Figure 1, Figure 4 is a wiring diagram of the control system to be applied to the air conditioning system of Figure 3, Figure 5 is a still further modification of the air conditioning system of Figure 1, Figure 6 is a wiring diagram of the control system applied to the air conditioning system of Figure 5, and Figure 7 is a cross sectional view taken on the line 7—7 of Figure 6.

Referring more particularly to Figure 1 the rear portion of a railway car of conventional construction is illustrated by the reference character 10, the rear compartment of the car being divided by means of a horizontal partition 12 into a compartment 11 and a compartment 13 which houses the air conditioning equipment. Located within the compartment 13 is an electric motor 14 which may be supported therein in any suitable manner and is shown as being attached to the ceiling of the railway car. This motor includes a shaft 15 which operates a compressor 16 and a fan 17.

The inlet of the compressor 16 communicates by means of the pipe 18 with a fresh air inlet 19 which may be located in the roof of the car, this inlet being provided with a suitable screen or filter 20 for removing dust particles from the air. Upon operation of the motor 14 the compressor 16 operates to draw air through the fresh air inlet 19, the air being compressed by the compressor and discharged through the pipe 22 whence the air flows over the heat exchanger or intercooler 23. This heat exchanger is shown to comprise a plurality of coils or pipes 24 mounted in the passageway 22 and through which pipes air is circulated by means of the fan 17. This fan 17 draws air through suitable ports 29 which may also be located within the roof of the car and this air is discharged by the fan through the fan outlet 20 whence the air flows through the pipes 24 and is discharged from the car through the outlet opening 30. The air which is compressed by the compressor 16 will also rise in temperature by reason of the compression thereof and will be considerably hotter than the outdoor air which is being circulated through the pipes of the heat exchanger by the fan 17 and hence this compressed air will be cooled by coming into contact with the pipes 24.

A spray nozzle 32 is positioned to direct a fine spray of water into the compressed air flowing through the passageway 22 and this spray has the effect of washing the compressed air and since this spray is directed over the coils of the heat exchanger it will also have the effect of increasing the heat exchange capacity of the heat exchanger so that the temperature of the compressed air flowing thereover will tend to more nearly approximate the temperature of the fresh air. Upon leaving the heat exchanger 23 the compressed air passes over suitable eliminator plates 35 which removes moisture or water particles from the air, the water draining into the sump 36, which sump is provided with a suitable drain pipe 37 for conducting the water away.

The compressed air which has now had some moisture removed therefrom by the eliminator plates 35 and which has been cooled to a temperature approximating the temperature of the fresh outdoor air flows into a turbine 40 which is mounted on the shaft 15 of the motor 14. The compressed air causes rotation of the turbine 40 and is expanded therein and leaves the turbine through the outlet 41 at a pressure which will be substantially atmospheric pressure. The work done by the air in causing rotation of the turbine causes reduction in the temperature of the air and since the turbine is mounted on the shaft 15 of the motor 16 is assists in the driving of the motor so that less energy is required to drive the motor 14 and the compressor 16 than would otherwise be required. Since the air entered the turbine at a high pressure and at a temperature not greatly above the temperature of the fresh or outdoor air, the air in expanding and driving the turbine 40 causes this temperature to be reduced to a value considerably below the temperature at which it entered the compressor 16. Accordingly relatively cool air flows from the turbine 40 and this air then flows through a Venturi tube 42, the outlet 43 of which is in communication with the interior of the railway car or space being conditioned.

Connected to a low pressure portion of the venturi 42 is a pipe 45 having a suitable inlet 46 through which air from the car flows and this air is mixed with the cool fresh air leaving the turbine 40 so that the air which enters the car is a mixture of the fresh cool air and the recirculated air from the car and this air will have a low relative humidity by reason of the fact that the temperature and dew-point of the fresh air leaving the turbine 40 is relatively low. The air may enter the car through suitable inlets positioned throughout the length thereof either in the side walls or the ceiling or in any desirable manner.

Referring now to Figure 2 wherein is illustrated the details of the control system for the air conditioning system described above, it will be seen that the motor 14 is a variable speed motor and the speed of this motor may be controlled by a step controller generally designated by the reference character 50. This step controller is shown to comprise a motor 51 having a shaft 52 carrying cams 53, 54, and 55. The motor 51 may be a proportioning motor of the type illustrated in Patent 2,028,110 issued to D. G. Taylor January 14, 1936. The cams 53, 54, and 55 control switch arms 56, 57, and 58, respectively, which cooperate with fixed contacts 59, 60, and 61, respectively. In the position illustrated, the cam 55 has the switch arm 58 in engagement with the fixed contact 61. Upon rotation of the motor shaft 52 in a direction to move the cams clockwise which will happen when the cooling load on the system increases as will be explained hereafter, the cam 54 will move its switch arm 57 into engagement with the contact 60 and upon a further increase in the cooling load the cam 53 will move its switch arm 56 into engagement with the contact 59. Power is supplied to the motor 14 by means of conductors 64 and 65 connected to any suitable source of power (not shown), these conductors being connected to the control box 66 which is provided with a common terminal 67, a low speed terminal 68, an intermediate speed terminal 69, and a high speed terminal 70. With the cams in the positions illustrated the common and low speed terminals are connected together as follows: from the terminal 67 through conductors 72, 73, 74, switch arm 58, contact 61, and conductor 75 to the terminal 68 and accordingly the motor 14 operates at low speed. When the cam 54 moves the switch arm 57 into engagement with the contact 60 the terminals 67 and 69 are connected together as follows: from the terminal 67 through conductors 72, 73, 77, switch arm 57, contact 60, and conductor 78 to the terminal 69 and the motor will then operate at an intermediate speed. When the cam 53 moves the switch arm 56 into engagement with the contact 59 the terminals 67 and 70 will be connected together as follows: from the terminal 67 through conductors 72, 79, switch arm 56, contact 59, and conductor 80 to the terminal 70 and the motor will then operate at high speed. While the motor 14 has been illustrated and described as a three-speed motor it should be understood that this motor may have as many different speeds as desired and has been illustrated as a three-speed motor for purposes of illustration only.

Located in the return air inlet 46 is a control device 85 for controlling the operation of the step controller 50 and this control device is illustrated herein as a combination temperature and humidity controller so arranged as to respond to the effective temperature of the air passing into the inlet 46 which will be substantially the same as the effective temperature of the air in the car. Referring again to Figure 2 it will be seen that the controller 85 comprises a bellows 86 connected by a capillary tube 87 to a bulb 88, this tube, bulb and bellows being provided with a suitable volatile fill whereby the bellows 86 will expand or contract in response to variations in the dry bulb temperature of the air passing through the inlet 46. The bellows 86 controls the position of a bell crank lever which comprises an arm 89 forming the control arm of a control potentiometer, the bell crank lever being pivoted at 90 and having a second arm 91 biased by means of a spring 92 into engagement with the bellows 86. As the temperature of the air passing over the bulb 88 decreases the bellows 86 will contract and the arm 89 will move toward the left over the potentiometer resistance 95, and upon an increase in temperature of the air passing over the bulb 88 the bellows 86 will expand and the arm 89 will move toward the right over the resistance 95.

The controller 85 also includes a humidity responsive element 100 which may be composed of any suitable material which expands and contracts in response to variations in humidity, this element 100 controlling the position of the control arm 101 which cooperates with a potentiometer resistance 102 and which arm is pivoted at 103 and is biased by means of a spring 104 to maintain the element 100 at a proper tension as is apparent from the drawing. As the humidity of the air entering the inlet 46 increases, the element 100 will elongate and the arm 101 will move toward the right over the resistance 102 under the influence of the biasing spring 104 and upon a decrease in the humidity the element 100 contracts and moves the arm 101 in the opposite direction with respect to the resistance 102.

The control arm 89 is connected to the center terminal of the motor 51 by means of a center tapped resistance 110, and conductors 111 and 112. The right end of the resistance 95 is connected to the left terminal of the motor 51 by means of conductors 115 and 113 whereas the opposite end of the resistance 95 is connected to the right hand terminal of the motor 51 by means of conductors 116 and 114. Upon reference to the aforementioned Taylor patent it will be understood that as the resistance between the center and outer terminals of the motor 51 is varied by the control arm 89, the shaft 52 of the motor will rotate in one direction or the other by an amount which will be proportional to the change in temperature of the air passing over the bulb 87. As the temperature increases and the arm 89 moves toward the right the shaft 52 of the motor 51 will be rotated to move the cams carried thereby in a clockwise direction as viewed in the drawing.

The control arm 101 of the humidity responsive element is connected to the center terminal of the motor 51 by means of conductor 120, variable resistance 121, and conductors 122 and 112. The right hand end of the potentiometer resistance 102 is connected to the left hand terminal of the motor 51 by means of conductors 125 and 113 whereas the opposite end of the resistance 102 is connected by means of conductors 126 and 114 to the right hand terminal of the motor 51. Power is supplied to the motor 51 by means of conductors 129 and 130 which may be connected to any suitable source of power (not shown). As the humidity of the air passing through the inlet 46 increases and the arm 101 moves toward the right it will tend to move the shaft 52 of the motor 51 in a direction to move the cams carried thereby in a clockwise direction. The resistance 121 in the circuit to the control arm 101 has the effect of rendering this control less effective than the control arm 89. In other words, a movement of the control arm 89 through a distance D will have the same effect on the motor 51 as a movement of the arm 101 throughout the total range of the resistance 102. Accordingly, the effect of a movement of arm 101 with respect to the resistance 102 is to shift the control range D of the arm 89 so that if the arm 101 moves toward the right by reason of an increase in relative humidity the control range D of the arm 89 is shifted toward the left so that a lower temperature will be maintained in the space being conditioned as the humidity in the space rises. The provision of the center tapped resistance 110 insures that the length of the control range D will be the same regardless of the particular location of this control range and since the resistance 121 in the circuit to the control arm 101 is adjustable, the relative effectiveness of the two control arms may be suitably adjusted. The resistance will be so adjusted that the effective temperature maintained within the conditioned space will always be within the comfort zone which may be determined from any suitable psychrometric chart. For example, if it be desired to maintain an effective temperature of 70° F., as the relative humidity increases from 30% to 70%, the dry bulb temperature will be decreased from approximately 78° F. to 73° F.

It will now be seen that if the effective temperature of the correlative effects of the temperature and relative humidity of the air entering the inlet 42 or in other words, of the air within the conditioned space, increases, the step controller 50 will increase the speed of the driving motor 14 which will increase the speed of the compressor 16 and increase the flow of cool fresh air which is forced into the chamber being conditioned. Obviously as the compressor 16 has its speed increased by the motor 14, the speed of the fan 17 will simultaneously increase to increase the flow of fresh air through the heat exchanger 23 so as to properly cool the air leaving the compressor at all times.

It may be that under certain circumstances the relative humidity in the car may become excessive so that even though the temperature in the car is reduced by the effective temperature controller 85 the conditions in the car may still be oppressive. Accordingly means may be provided for reducing or shutting off the flow of spray water to the spray 32 so that the humidity of the air passing to the turbine 40 will be lowered. For this purpose a valve 130 is placed in the pipe leading to the spray nozzle 32 and the operation of this valve may be controlled by a proportioning motor 131 similar to the proportioning motor 51 of the step controller 50. The motor 131 may be controlled by a humidity responsive device 135 which is shown to be located within the conditioned space but obviously may be located within the return air inlet 46 if desired. The humidity responsive device 135 may comprise a humidity responsive element 136 of any suitable character which controls the position of the control arm 137 which moves over the potentiometer resistance 138 in response to variations in humidity within the conditioned space. As the humidity within the space rises, arm 137 moves toward the right and causes the motor 131 to move the valve 130 towards closed position to reduce the amount of spray water admitted to the spray nozzle 32 and thus reducing the amount of humidity which is added to the air thereby. On the other hand if the humidity within the space becomes low the valve 130 will be opened by the motor 131 thus increasing the amount of washing effected by the spray nozzle and also increasing the heat exchange capacity of the intercooler 23. It should be understood however that the amount of water added to the air has very little effect on the temperature or dew point of the air delivered by turbine 40, as the condensation of moisture in turbine 40 will increase as the humidity of the air entering the turbine increases. A drain 59 connected to the drain 37 may be provided for effecting removal of this condensate.

The operation of the system shown in Figures 1 and 2 should now be clear but may be briefly reviewed as follows: fresh air is drawn through the inlet 20, compressed by the compressor 16 where its temperature and pressure are both increased, washed by the spray 32, reduced in temperature by the heat exchanger 23 through which fresh air is circulated by the fan 17, the temperature of which air is relatively low compared to the temperature of the compressed air. The compressed air leaves the heat exchanger 23 at the higher pressure but at a temperature approximating the temperature of the fresh air and is passed over the eliminator plates 35 whereby entrained moisture is removed from the compressed air, the air then expanding in the turbine 40 and being considerably reduced in temperature, the energy given up by the expansion of the air assisting in driving the compressor 16. The turbine 40 may recover as much as 30% of the work done by the compressor, thus reducing by 30% the power required to drive the motor 14. The air now has its pressure reduced substantially to atmospheric pressure and its temperature reduced considerably below that of the outside air and this air is then mixed with recirculated air from the conditioned space and the mixture of conditioned and recirculated air is supplied to the space in any suitable manner. The amount of fresh conditioned air is varied in a manner to maintain proper conditions of comfort within the space by varying the speed of operation of the compressor 16 and should the humidity within the space become excessive the supply of spray water from the spray nozzle may be reduced. While the speed of the compressor has been illustrated as being controlled by an effective temperature controller it will be understood that if desired the speed may be adjusted solely in response to temperature or some other condition.

Referring now to Figure 3 it will be noted that the inlet openings 25 in the roof of the car have been eliminated and that the air admitted to the fan 17 to be supplied to the heat exchanger or inter-cooler is supplied from the interior of the car or the vestibule thereof. The air is drawn into the compartment 13 wherein is located the air conditioning equipment, by means of a fan 200 which draws air from the vestibule through a cooling tower designated by the reference character 201, this cooling tower being provided with inlet openings 202. Located within the upper portion of the cooling tower is a spray pipe 203 having a plurality of downwardly directed spray nozzles through which water flows and the air passing upwardly through the cooling tower passes in counter current relationship with the water spray and is cooled thereby by the evaporation of the water. The air then passes to the inlet of the fan 17 and through the heat exchanger 23 for cooling the air which has been compressed by the compressor 16 and in this manner a greater cooling of the air is effected than in the first form of the invention wherein the compressed air is cooled only by the fresh air circulated by the fan 17 which will be at a higher temperature than the air passing through the cooling tower 201.

The washing spray 32 is supplied with water from a sump 205 located below the cooling tower 201, a suitable pump 206 being provided for supplying the water from the sump 205 to the spray nozzle 32. Connected in parallel with a portion of the pipe 208 connected between the outlet of the pump 206 and the spray 32 is a coil 210 located beneath the heat exchanger 23 and the flow of water through this coil is controlled by a valve 211 operated by a proportioning motor 212. When the valve 211 is closed the water flowing to the spray 32 flows through the coil 210 but when the valve 211 is opened the water may by-pass the coil 210 and flow directly from the sump 205 to the spray nozzle 32.

The motor 212 is controlled in response to the humidity of the air entering the return air inlet 46 by means of the humidity responsive device 220. Referring to Figure 4 it will be seen that this humidity responsive device includes a humidity responsive element 221 which controls the position of a slider arm 222 with respect to a potentiometer resistance 223 and upon an increase in humidity of the air in the car, or the air entering the return air inlet 46, the slider arm 222 moves towards the right and this action of the slider arm has the effect of causing motor 212 to move the valve 211 towards open position whereby the water flowing to the spray 32 may by-pass the coil 210 and accordingly the water flowing to the spray 32 will be cooler than if it flowed through the coil 210 where it absorbs heat from the air leaving the heat exchanger 23 and accordingly will cause a lesser rise in humidity of the air leaving the compressor 16 than when the valve 211 is closed, in which case the coil 210 absorbs heat from the air and is supplied at a higher temperature to the air by the spray 32. In this manner the humidity of the air in the conditioned space may be effectively controlled.

The water which is removed from the air by the eliminator plates 35 flows from the sump 36 and drain 99 from turbine 40 by way of the pipe 225 to the spray 203. Located between the inlet of the spray 203 and the sump 205 is a pipe 226 which permits flow of water directly from the pipe 225 to the sump 205 without flowing through the spray 203, this pipe being controlled by a valve 230 which is in turn controlled by a proportioning motor 231. The motor 231 is controlled by a suitable temperature responsive device 232 which is shown in Figure 4 to comprise a bulb 233 located within the return air inlet 46 and connected by means of a capillary tube 234 to a bellows 235 which controls the position of a slider arm 236 which in turn cooperates with a potentiometer resistance 237. As the temperature in the space decreases, the temperature of the air passing over the bulb 233 will decrease, the slider arm 236 will move towards the left over the resistance 237 and the motor 231 will operate to move the valve 230 towards open position thus decreasing the flow of water through the spray 203 and increasing the flow of water through the by-pass pipe 226. Accordingly the air flowing upwardly through the cooling tower 201 will contact a smaller volume of water and less evaporative cooling of the air will be effected. Accordingly the air supplied to the fan 17 and the heat exchanger 23 for cooling the compressed air leaving the compressor 16 will be at a higher temperature so that the air entering the turbine 40 will be somewhat warmer and likewise the air leaving the turbine 40 and mixing with the air entering with the return air inlet 46 will have a higher temperature so that warmer air will be supplied to the space being conditioned. On the other hand should the temperature in the space increase, the valve 230 will move towards closed position thus increasing the flow of water through the sprays 203 so that cooler air will be supplied to the fan 17 and the temperature of the air leaving the compressor will be reduced to a greater extent and in this manner cooler air will be supplied to the interior of the space. The valve 230 may move from open to closed position as the temperature in the car increases from 75° F. to 80° F.

It will thus be seen that while the principles of the system shown in Figure 3 are substantially the same as in Figure 1 the control arrangement therefore is somewhat different and in Figure 3 the temperature of the air leaving the car is controlled by controlling the spray water or in other words, the temperature of the air passing through the cooling tower 201. The humidity in the space is controlled by controlling the valve 211 which in turn controls the temperature of the water leaving the spray 32 and as the humidity rises from 45% to 55% for example, the valve 211 will move from closed to open position thus decreasing the amount of water flowing through the coil 210 so that cooler water will be supplied to the nozzle 32 which has the effect of causing the air passing to the turbine 40 to have a lower relative humidity. On the other hand as the humidity decreases, the valve 211 is moved towards closed position which increases the flow of water through the coil 210 thus further reducing the temperature of the air leaving the heat exchanger 23 but at the same time the temperature of the water leaving the spray 32 will be somewhat higher which will tend to increase the humidity of the air. Accordingly it will be seen that the temperature of the air in the conditioned space is controlled by controlling the temperature of the cooling tower 201 and the humidity of the air is controlled by controlling the temperature of the washing spray 32. The air entering tower 202 may be exhausted conditioned air from the car at a low wet bulb temperature thus giving an added degree of sensible cooling.

Referring now to Figure 5 an air conditioning system is illustrated which is basically like that shown in Figures 1 and 3 but the details thereof are somewhat different. In this figure compressed air from the train line or other suitable source flows through a pipe 300 to a turbine 301 located beneath the car, the air driving the turbine and expanding therein and being delivered to an eliminator chamber 302 provided with a series of eliminator plates 303 for removing moisture from the air. The inlet of the chamber 302 through which the expanded air is delivered is provided with a suitable fresh air inlet opening 304 which is so formed that the air discharged from the turbine 301 will entrain fresh air which will flow through the opening 304 and mix with the expanded air from the turbine 301.

Prior to passing to the turbine 301, the compressed air in the line 300 is suitably cooled by passing through a spray from a series of spray nozzles 306, that portion of the pipe 300 located below the spray 306 being provided with a series of fins 307 spaced closely enough together so that water flowing thereover will be held thereon by capillary action between the fins, thus increasing the cooling effect of the water. The water to the spray 306 is delivered from a suitable storage tank 308 to which water is delivered from any suitable source and on a railroad train the water leaving wash basins, water fountains, etc., may be delivered to this tank 308 so that this water is used for a useful purpose. The compressed air which has now been reduced in temperature by the spray 306 flows to the turbine 301 under the control of a valve 310 operated by a proportioning motor 311 which is controlled in a manner to be later described. In order to utilize the energy given up by the compressed air in expanding in the turbine 301, this turbine may drive a generator 312 for supplying power to the batteries 313 which in turn supply power to various portions of the air conditioning apparatus as will become apparent as the description proceeds. Condensate draining from turbine 301 goes via pipe 99 to compressed air cooler 340.

The air leaving the turbine 301 which on expanding to atmospheric pressure has its temperature greatly reduced to a value below its dew-point will produce a fine fog or mist in the chamber 302 when mixed with humid air entering at 304 and this air which is mixed with the fresh unconditioned air has this moisture removed by means of the eliminator plates 303 and the combination of the expanded air having a low dew-point with the fresh unconditioned air will produce a mixture of air having a low relative humidity. This air passes through a passageway 315 which leads to an outlet opening 316 communicating with another passageway 317 which may be located within the roof of the car and extending longitudinally thereof and provided with suitable downwardly directed openings 318 by means of which the air passes to the interior of the car. It will be apparent that the air may be admitted to the interior of the spaces or cars in Figures 1 and 3 in the same manner. Return air is circulated through the car and mixed in the chamber 317 with the fresh conditioned air by means of a fan 325 located within a chamber 326 which has outlets 327 and 328 located above and below the conditioned air outlet 316 so that the air will be properly mixed with the fresh conditioned air. The chamber 326 has inlets 327' and 328' which may be located in the rear compartment of the car and the vestibule respectively and dampers 329 suitably interconnected by the adjusting mechanism 330 are provided for regulating the flow of air through these return air inlets. These dampers may be adjusted in any suitable manner and for purposes of illustration have been shown as being manually adjusted and are so arranged that both dampers will be simultaneously opened or closed.

Located within the chamber 326 is a cooling coil 335 which is provided for removing sensible heat only from the recirculated air and this cooling coil forms the evaporator of a mechanical refrigerating system which includes a compressor 336 driven by a motor 337. The high pressure side of the compressor communicates by means of a pipe 338 with a condenser 340 which in turn communicates by means of the pipe 341 and the thermostatic expansion valve 342 with the inlet of the evaporator 335. The outlet of the evaporator communicates with the inlet of the compressor by means of the pipe 345. The operation of the compressor is illustrated as being controlled by a device responsive to the pressure on the high pressure side of the system and a device responsive to the pressure on the low pressure side of the system. For this purpose, a bellows 350 is connected by means of a pipe 351 with the pipe 338 connected to the high pressure side of the compressor and the bellows 350 controls the position of an arm 353 which cooperates with a fixed contact 352. The arrangement is such that as the head pressure on the compressor rises to a sufficiently high value the bellows 350 will expand and move the arm 353 out of engagement with the contact 352 and upon a drop in the head pressure to a predetermined value the bellows 350 will contract and the arm 353 will move back to engagement with the contact 352. A second bellows 355 is connected by means of a pipe 356 with the suction line 345 leading to the compressor inlet and this bellows controls the position of an arm 357 with respect to a contact 358. The arrangement is such that upon a drop in suction pressure to a predetermined value the contraction of the bellows 355 permits the arm 357 to move downwardly out of engagement with respect to the contact 358 and upon a rise in the suction pressure to a predetermined value the bellows 355 will expand and move the arm 357 back into engagement with the contact 358. The battery 313 is provided for supplying power to the compressor motor 337 and when the switch arms 353 and 357 are in engagement with their respective contacts power is supplied to the motor 337 as follows: from one side of the battery 313 through conductors 360, 361, switch arm 351, contact 352, conductor 363, switch arm 357, contact 358, conductor 365, motor 337, and conductors 366 and 367 to the other side of the battery 313. Accordingly it will be seen that the compressor is placed in operation whenever the suction pressure is above a predetermined value and the head pressure is below the predetermined value but should the head pressure become high enough or the suction pressure become low enough the circuit to the compressor motor will be interrupted and the compressor will stop operating. The suction pressure controller will be set at such a value, as for example 50 lbs. to 65 lbs., that during normal operation of the system the temperature of the evaporator 337 will not become low enough to cause condensation of moisture thereon as it is intended that the evaporator effect only sensible cooling of the air, but will be between 55° F. and 70° F. for example.

The condenser 340 may be provided with a series of fins 370 similar to the fins 307 on the pipe 300 so that the spray 306 will also cool the condenser in the same way as it does the pipe 300 which carries compressed air to the turbine or expansion device 301.

Power is supplied to the fan motor 325 for directing air through the chamber 326 by the battery 313 as follows: from one side of the battery through conductors 360, 375, fan motor 325, and conductors 376 and 367. Suitable manually operated switches may be provided if desired for interrupting operation of the fan motor 325 and the compressor motor 337 whenever desired.

The flow of refrigerant to the cooling coil 335 may be controlled by an expansion valve 342, this expansion valve being a thermostatic expansion valve having suitable means for varying the superheat setting thereof. The construction of this expansion valve forms no part of the present invention but may be constructed as illustrated in Patent 2,019,724, issued November 5, 1935 to C. A. Otto. Such an expansion valve comprises an operating diaphragm or bellows forming a pair of compartments to one of which is connected a bulb 400 by means of a capillary tube 401, this bulb being provided with a suitable volatile fill and being positioned in contact with the outlet of the evaporator so that one side of the bellows will be subjected to a pressure corresponding to the temperature of the refrigerant leaving the evaporator. The other side of the operating bellows or diaphragm is subjected to the pressure of the refrigerant in the evaporator so that the operating bellows or diaphragm moves in accordance with variations in the superheat of the refrigerant at the outlet of the evaporator. The valve is biased towards closed position by means of a spring 402 and the tension of the spring may be adjusted by means of a proportioning motor 405 so that the valve may be adjusted to maintain varying degrees of superheat which has the effect of varying the effective cooling surface of the evaporator.

The adjustment of this spring by the motor 405 is controlled by a thermostat 410 which thermostat is shown to comprise a bulb 411 located in the return air inlet duct 327', this bulb being connected by means of a capillary tube 412 with the bellows 413 which controls the position of the slider arm 414 with respect to the potentiometer resistance 415. As the temperature of the air in the car or the air entering the inlet 327 increases, the bellows 413 will expand and move the arm 414 toward the right with respect to the resistance 415. Upon a decrease in the temperature of the space being conditioned, the arm moves in the opposite direction with respect to the resistance 415.

Located around the evaporator adjacent the inlet portion thereof and insulated therefrom by suitable spacer members 420 is a perforated member 421 which is located in close proximity to the evaporator coil, this member being located close enough to the evaporator so that if any condensation forms thereon a circuit is established between the evaporator coil and the member 421 which will energize a relay 425. This relay comprises a coil 426, an armature 427 connected to a switch arm 428, and this switch arm cooperates with fixed contacts 429 and 430. Upon energization of the coil 426 the arm 428 is moved into engagement with the contact 430 and upon deenergization thereof the arm moves out of contact therewith and into engagement with the contact 429 under the influence of gravity or any suitable biasing means. A battery 431 may be provided to supply power to the relay 425 or any other suitable source of power may be employed. As soon as condensation forms on the evaporator and a circuit between the evaporator coil 335 and the member 421 is completed by the moisture thereon, relay coil 426 will be energized as follows: from the battery 431 through conductor 435, the evaporator coil 335, member 421, conductor 436, relay coil 426 and conductor 437 to the other side of the battery 431. Energization of the relay causes arm 428 to move into engagement with the contact 430 as described above. The member 421 may be composed of a sheet of perforated material wound around the pipe and clamped together by means of the clamping screw 440 as shown in Figure 7. The spacer members 420 are separated as shown in Figure 7 to permit an upward flow of air between the evaporator coil and the member 421 so that evaporation of moisture which condenses on the evaporator coil may be rapidly effected, the perforations in the member 421 permitting that portion of the evaporator coil surrounded thereby to be contacted by the air passing through the chamber 326.

When the relay 425 is energized by reason of condensation of moisture on the evaporator indicating that the evaporator is removing latent heat from the air, the center and left hand terminals of the proportioning motor 405 are directly connected together as follows: from the center terminal of the motor through conductor 440, switch arm 428, contact 430, and conductors 441 and 442 to the left hand terminal of the motor. When these terminals are directly connected together in this manner the motor 405 operates to completely close the expansion valve to prevent flow of refrigerant through the evaporator and when this happens the suction pressure on the compressor will rapidly decrease so that the compressor will shut down. Until the temperature in the evaporator rises sufficiently so that the moisture on the evaporator coil has been evaporated, the expansion valve will remain closed so that there will be no further cooling thereby. As soon as the moisture on the evaporator coil has evaporated however the circuit to the relay 425 will be interrupted and the arm 428 will move into engagement with the contact 429. The center terminal of the motor 405 will now be connected to the control arm 414 of the temperature responsive device 410 as follows: from the center terminal of the motor through conductor 440, arm 428, contact 429 and conductor 450 to the arm 414. The right hand end of the resistance 415 is connected by means of the conductor 451 to the right hand terminal of the motor 405 and the opposite end of the resistance 415 is connected by means of conductors 452 and 442 to the left hand terminal of the motor 405. It will accordingly be apparent that the motor 405 will operate in accordance with the temperature of the air at the bulb 411 and as the temperature increases the motor will operate to adjust the setting of the spring 402 so that the expansion valve will maintain the refrigerant at the evaporator outlet at a lower degree of superheat so that a greater portion of the evaporator coil will be flooded and more cooling will be effected thereby. Conversely upon a decrease in temperature of the air entering the inlet 327 the spring 402 of the expansion valve will be adjusted so that a higher degree of superheat of the refrigerant at the evaporator outlet will be maintained and a smaller area of the coil will be effective for cooling purposes and the temperature of the air passing thereover will be reduced to a lesser extent. It will be apparent that when the relay 425 is energized by reason of condensation on the evaporator the movement of arm 428 out of engagement with contact 429 interrupts the circuit to the control arm 414 so that the thermostat has no control whatever over the position of the expansion valve.

For controlling the operation of the valve 310 which regulates the flow of compressed air from the pipe 300 to the expander 301 is a humidity responsive element 460 which responds to the humidity of the air passing from the rear compartment of the car through the return air inlet opening 327'. This humidity responsive device comprises a humidity responsive element 461 which controls the position of a slider arm 462 with respect to the potentiometer resistance 463, the slider arm and resistance cooperating to control the motor 311 which positions the valve 310. Upon an increase in humidity of the air in the space being conditioned or of the air passing through the return air inlet 327', the slider arm 462 will move towards the right over the resistance 463 and cause the motor 311 to move the valve 310 towards open position by an amount which is proportional to the increase in humidity. As the amount of compressed air to the turbine 301 is increased there will be a greater amount of cooled air with a low dew-point admitted to the chamber 302 and accordingly mixed with the cooled return air from the chamber 326 which will have the effect of reducing the relative humidity in the space being conditioned. This humidity responsive device may operate to move the valve from a fully closed position to a fully open position as the humidity in the space increases from 45% to 55% for example.

It will now be understood that in this form of the invention the humidity in the space is controlled by controlling the supply of compressed air to the turbine 301 and as the humidity increases the valve 310 moves from closed to open position. The sensible cooling of the air in the conditioned space is effected mainly by the evaporator coil 335 of the refrigeration system which reduces the temperature of the recirculated air but which is controlled so that it does not effect any latent cooling of the air in the conditioned space so that the load on the refrigeration system is reduced to a minimum. In order to secure this result the compressor is operated to maintain the suction pressure between values of 50 lbs. to 65 lbs., for example, assuming a refrigerant such as Freon or F12 is utilized which will maintain the coil temperature between values such as 55° F. and 70° F., and by maintaining the suction pressure between these limits, under normal circumstances no moisture will condense on the evaporator coils. Should there be such condensation of moisture however indicating that the refrigeration system is effecting some latent cooling, the device 421 operates to energize the relay 425 which closes the expansion valve. Normally however the expansion valve is controlled in accordance with the temperature in the conditioned space and this valve is adjusted to maintain a maximum superheat when the temperature in the space is 75° for example and to reduce the superheat as the temperature increases so that at 80° for example the amount of superheat will be at a minimum. Accordingly substantially all of the cooling of the sensible air is effected by the refrigeration system at high efficiency and the latent cooling is effected by the compressed air expansion system, and the energy given up by the compressed air in the expanding thereof is utilized for driving the generator 392 to charge the battery 313 which furnishes energy for the compressor driving motor and the fan motor. This may be augmented by another source of power if necessary.

While the various forms of air conditioning systems embodying my invention have been illustrated particularly in connection with railway cars and the like it should be understood that the systems disclosed are applicable in general to air conditioning systems for all types of structures.

Having described some preferred forms of my invention, it should be understood that many modifications may become apparent to those skilled in the art, for example, the various control systems in the various views may be embodied in the other views, and the inside temperature may, if desired, be adjusted in accordance with outside temperatures. It should therefore be understood that my invention is to be limited only by the scope of the appended claims.

I claim as my invention:

1. A method of conditioning the air in a space which comprises compressing fresh unconditioned air, washing the compressed air, reducing the temperature of the compressed air, removing moisture from the cooled, compressed air, expanding the compressed air to further reduce the temperature thereof, mixing the compressed air which has been expanded with unconditioned air from the space, delivering the mixture of conditioned and unconditioned air to the space, controlling the rate of compression of the air in accordance with a condition of the air in the space, and controlling the amount of washing of the air in accordance with the humidity of the air in the space.

2. In an air conditioning system for a space, means for compressing outside air, means for passing said compressed air in heat exchange relationship with a flow of relatively cool air to reduce the temperature of the compressed air, means for washing the air prior to having its temperature reduced to cleanse the same, means for expanding the air to further reduce the temprature thereof, means for delivering the air to the space to be conditioned, and means responsive to the humidity of the air in the space in control of the washing means.

3. In an air conditioning system for a space, means for compressing outside air, means for passing said compressed air in heat exchange relationship with a flow of relatively cool air to reduce the temperature of the compressed air, means for washing the air prior to having its temperature reduced to cleanse the same, means for expanding the air to further reduce the temperature thereof, means for delivering the air to the space to be conditioned, means for controlling the speed of the air compressing means to maintain the effective temperature within the space at a substantially constant value, and means responsive to a rise in humidity in the space to an excessive value to decrease the flow of water to the washing means.

4. In an air conditioning system for a space, means for compressing air, a spray for washing said compressed air, conduit means for delivering water to said spray, a valve in said conduit means for controlling said spray, means including space humidity responsive means controlling said valve without affecting operation of said compressor means, means for removing entrained moisture from said air, means for utilizing said air to aid the operation of said compressor and at the same time expanding said air to further reduce its temperature, and means for delivering said expanded air to the space.

5. In an air conditioning system for a space, means for compressing outside air, means for passing said compressed air in heat exchange relationship with a flow of relatively cool air to reduce the temperature of the compressed air, means for washing the air prior to having its temperature reduced to cleanse the same, means for expanding the air to further reduce the temperature thereof, means for delivering the air to the space to be conditioned, conduit means for supplying water to said washing means, a valve in said conduit means, and means including a device responsive to the humidity in the space for controlling the position of said valve.

6. In an air conditioning system for a space, means for compressing air, a spray for washing said compressed air, conduit means for delivering water to said spray, a valve in said conduit means for controlling said spray, means including space humidity responsive means in control of said valve, means for removing entrained moisture from said air, means for expanding said air to further reduce its temperature, a Venturi discharge pipe, an opening adjacent the throat of said Venturi pipe communicating with air returning from said space, and means for delivering said expanded air to said Venturi discharge pipe, said expanded air having sufficient velocity to draw in said opening and mix therewith return air.

7. In an air conditioning system for a space, means for compressing outside air, means for passing said compressed air in heat exchange relationship with a flow of relatively cool air to reduce the temperature of the compressed air, means for washing the air prior to having its temperature reduced to cleanse the same, said washing means comprising a spray nozzle, means for supplying water to the spray nozzle, means to return the water to the supplying means, means for utilizing the water returning to the supplying means for further reducing the temperature of said flow of relatively cool air for further reducing the temperature of the compressed air, means for expanding the air to further reduce the temperature thereof, and means for delivering the air to the space to be conditioned.

8. In an air conditioning system for a space, means for compressing outside air, means for passing said compressed air in heat exchange relationship with a flow of relatively cool air to reduce the temperature of the compressed air, means for washing the air prior to having its temperature reduced to cleanse the same, said washing means comprising a spray nozzle, means for supplying water to the spray nozzle, means to return the water to the supplying means, means for utilizing the water returning to the supplying means for further reducing the temperature of said flow of relatively cool air, means for expanding the air to further reduce the temperature thereof, means for delivering the air to the space to be conditioned, and means responsive to the temperature of the space in control of the amount of cooling of said flow of relatively cooled air by the water returning to the supplying means.

9. In an air conditioning system for a space, means for compressing outside air, means for passing said compressed air in heat exchange relationship with a flow of relatively cool air to reduce the temperature of the compressed air, means for washing the air prior to having its temperature reduced to cleanse the same, said washing means comprising a spray nozzle, means for supplying water to the spray nozzle, means to return the water to the supplying means, means for utilizing the water returning to the supplying means for further reducing the temperature of said flow of relatively cool air, a cooling coil for further cooling the compressed air valve means for controlling the flow of washing water through said cooling coil prior to passing to said nozzle, means to expand the air to further reduce the temperature thereof, means for delivering the air to the space to be conditioned, and means responsive to the humidity of the air in the space being conditioned for controlling said valve means.

10. In an air conditioning system for a space, means for compressing outside air, means for passing said compressed air in heat exchange relationship with a flow of relatively cool air to reduce the temperature of the compressed air, means for washing the air prior to having its temperature reduced to cleanse the same, said washing means comprising a spray nozzle, means for supplying water to the spray nozzle, means to return the water to the supplying means, means for utilizing the water returning to the supplying means for further reducing the temperature of said flow of relatively cool air, a cooling coil for further cooling the compressed air, valve means for controlling the flow of washing water through said cooling coil prior to passing to said nozzle, means to expand the air to further reduce the temperature thereof, means for delivering the air to the space to be conditioned, means responsive to the humidity of the air in the space being conditioned for controlling said valve means, and means responsive to the temperature of the air in the space in control of the amount of cooling of the flow of relatively cool air by the water returning to the supplying means.

11. In an air conditioning system for a space, means for compressing outside air, means comprising a spray head for washing said air, means for supplying water to said spray head, means for returning said water to the supplying means, means for cooling said compressed air, said cooling means comprising a cooling tower utilizing water returning to said supplying means for cooling uncompressed air, said cooling means further comprising means for passing relatively cool air, including the air which is cooled by said cooling tower, in heat exchange relationship with said compressed air for cooling it, means for expanding the air to further reduce the temperature thereof, and means for delivering the expanded air to the space to be conditioned.

12. In an air conditioning system for a space, means for compressing outside air, means comprising a spray head for washing said air, means for supplying water to said spray head, means for returning said water to the supplying means, means for cooling said compressed air, said cooling means comprising a cooling tower utilizing water returning to said supplying means for cooling uncompressed air, said cooling means further comprising means for passing relatively cool air, including the air which is cooled by said cooling tower, in heat exchange relationship with said compressed air for cooling it, means for expanding the air to furthed reduce the temperature thereof, means for delivering the air to the space to be conditioned, and means responsive to the temperature of the space in control of the amount of cooling accomplished by said cooling tower.

13. In an air conditioning system for a space, means for compressing outside air, means comprising a spray head for washing said air, means for supplying water to said spray head, means for returning said water to the supplying means, means for cooling said compressed air, said cooling means comprising a cooling tower utilizing water returning to said supplying means for cooling uncompressed air, said cooling means further comprising means for passing relatively cool air, including the air which is cooled by said cooling tower, in heat exchange relationship with said compressed air for cooling it, a cooling coil for further cooling the air, valve means for controlling the flow of washing water through said cooling coil prior to passing to said spray head, means to expand the air to further reduce the temperature thereof, means for delivering the air to the space to be conditioned, and means responsive to the humidity of the air in the space to be conditioned for cotrolling said valve means.

14. In an air conditioning system for a space, means for compressing outside air, means comprising a spray head for washing said air, means for supplying water to said spray head, means for returning said water to the supplying means, means for cooling said compressed air, said cooling means comprising a cooling tower utilizing water returning to said supplying means for cooling uncompressed air, said cooling means further comprising means for passing relatively cool air, including the air which is cooled by said cooling tower, in heat exchange relationship with said said compressed air for cooling it, a cooling coil for further cooling the air, valve means for controlling the flow of washing water through said cooling coil prior to passing to said sprey head, means to expand the air to further reduce the temperature thereof, means for delivering the air to the space to be conditioned, means responsive to the humidity of the air in the space to be conditioned for controlling said valve means, and means responsive to the temperature of the air in the space in control of the amount of cooling accomplished by said cooling tower.

ROBERT B. P. CRAWFORD.